United States Patent [19]

Müller

[11] Patent Number: 4,538,402

[45] Date of Patent: Sep. 3, 1985

[54] DEVICE FOR PREVENTING THE JAMMING OF A DISC MOWER BY, OR THE BREAKING UP, A LAYER OF SOIL AND PLANT MATTER

[76] Inventor: Paul E. Müller, Herdernstrasse 16, CH-8004 Zurich, Switzerland

[21] Appl. No.: 524,603

[22] Filed: Aug. 19, 1983

[51] Int. Cl.³ .............................................. A01D 55/18
[52] U.S. Cl. .......................................... 56/13.6; 56/6
[58] Field of Search .................. 56/6, 13.6, 17.4, 503, 56/192, 295, DIG. 24

[56] References Cited

U.S. PATENT DOCUMENTS

| | | | |
|---|---|---|---|
| 3,524,306 | 8/1970 | Reber | 56/192 |
| 4,202,156 | 5/1980 | Golyanovsky et al. | 56/13.6 |
| 4,304,088 | 12/1981 | Werner | 56/13.6 |
| 4,426,828 | 1/1984 | Neuerburg | 56/13.6 |

Primary Examiner—Gene Mancene
Assistant Examiner—John G. Weiss
Attorney, Agent, or Firm—Thomas W. Speckman

[57] ABSTRACT

Disc mowers having a drive casing to accommodate the drive means for disc-shaped rotary cutters with knives attached thereto tend to permit a layer of soil and plant matter to build up in the overlap region of the knives between adjacent stone guards. This tendency is prevented according to the invention by a scraper and deflection element disposed in the overlap region at the front face of the drive casing below the rotary knives and between the rotary cutter discs in the overlap region of the knives. The scraper and deflection element may be adapted to cooperate with mechanically, hydraulically or pneumatically powered cleaning elements to prevent and to remove solid build-up in the overlap region.

5 Claims, 21 Drawing Figures

DEVICE FOR PREVENTING THE JAMMING OF A DISC MOWER BY, OR THE BREAKING UP, A LAYER OF SOIL AND PLANT MATTER

BACKGROUND OF THE INVENTION

The present invention relates to a device for preventing the jamming of a disc mower by a layer of soil and plant matter building up on the disc mower, or for breaking up an already formed layer of such material.

The critical area for a layer of soil and plant matter to build up is primarily in the region of overlap of the blades of two adjacent rotary cutters.

SUMMARY OF THE INVENTION

An object of the present invention is to provide a device which is capable of preventing the building up of a layer of soil and plant matter on a disc mower or, if such a layer has already been formed, of breaking it up and eventually removing it from the disc mower. It is a further object of the invention to protect the drive casing from being damaged by deformed cutter blades.

This dual object of the present invention is accomplished by a device for a disc mower including drive means in a casing for driving the disc-shaped rotary cutters and blades attached thereto and further including sliding shoes and stone guard elements secured on the drive casing, which device is characterized in that at the front face of the drive casing below the plane of the rotary knives and between the rotary cutter discs in the overlap region of the knives at least one such device is disposed which is effective to prevent a jamming in this region and/or to disintegrate any solid and plant buildup.

For a better understanding, the drawings first show several views of a disc mower which will be described in the following as the basic disc mower type.

BRIEF DESCRIPTION OF THE DRAWING

The various numerous embodiments of the device of the present invention are illustrated in the drawings in a substantially diagrammatic fashion as follows:

FIG. 3b is a front view of the portion shown in FIG. 3a;

DESCRIPTION OF PREFERRED EMBODIMENTS

For ease of understanding of the diagrammatically illustrated embodiments of the device of the present invention, following is a brief discussion of a commonly known commercially available disc mower.

Figure 1:
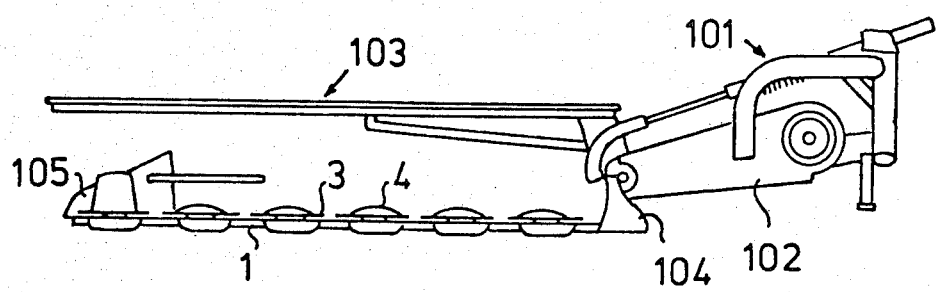
FIG. 1 is a front view of a disc mower.

FIG. 1 is a representation of a complete disc mower which usually serves as an attachment for a farm tractor. The disc mower as such may, of course, also be installed on any other suitable agricultural machine. Support frame 101 of the disc mower is connected to the hydraulic power lift of the tractor. The drive assembly, such as a pulley and belt drive 102, for example, is operated by a power take-off shaft. The power is transmitted to the rotary cutters by bevel gears 104 and by cutter gears mounted in the drive casing 1 of the cutterbar. Drive casing 1 is covered by a cutterbar guard 103 at a certain height, in the form of some type of grate. A swath board 105 is provided at the end of the drive casing 1 which is opposite bevel gears 104.

Figure 2:
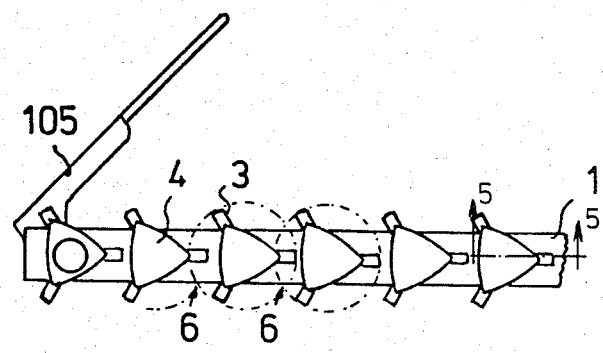
FIG. 2 is a top plan view of the same disc mower (without suspension and drive)

FIG. 2 shows drive casing 1 in a top plan view in which the structural members not essential to the present invention have been omitted. These are the support frame 101, the belt drive 102, the bevel gears 104 and the cutterbar guard 103. Rotary discs 4 on drive casing 1 are clearly shown. The basic shape of the discs in this instance is triangular with convexly curved sides. Radially projecting from the corners of rotary cutter discs 4 are blades or knives 3. The relative angular position of the rotating discs remains constant due to the gears of the cutter drive running in drive casing 1. The cutting range of knives 3 of two adjacent rotating discs overlaps. This area is referred to as overlap region 6 and is particularly critical in the building up of a layer of soil and plant matter on the cutterbar.

Figure 3:
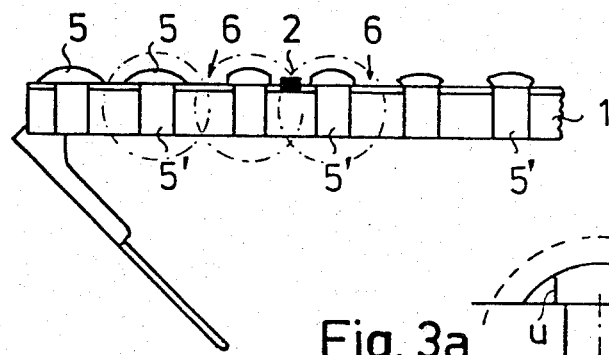
FIG. 3 shows the disc mower of FIG. 2 from below.

FIG. 3 shows the same structural portion of the disc mower as shown in FIG. 2, with the same omissions, but in a view from below. Mounted on drive casing 1 are slide shoes 5' which terminate at their front ends, viewed in the direction of travel of the disc mower, in a stone or rock guard 5. Overlap region 6 is always between two stone guards 5. Disposed in this overlap region are the inventive scraper and deflection elements 2, and for the sake of clearness, only one scraper and deflection element is shown in the drawings.

With the foregoing description of FIGS. 1–3 as a basis, the following discussion of the diagrammatic representations of FIGS. 4–19 will be readily understood.

An object of the present invention is to prevent a layer of soil and plant matter from building up in the overlap region of knives 3 on drive casing 1. This is accomplished firstly, by specially constructed scraper and deflection elements 2, and, secondly, by cleaning members which will be described later. The scraper and deflection element has the additional function of protecting drive casing 1 against any possible blow from a deformed knife 3.

Figure 4:
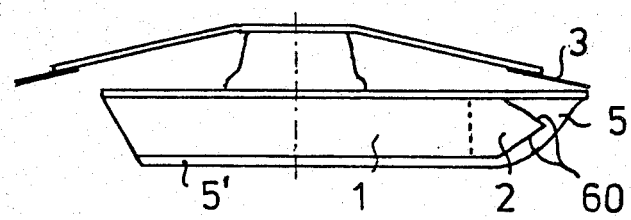
FIG. 4 shows one embodiment of a scraper and deflection element according to the invention which is integral with the drive casing.

In the most direct embodiment, FIG. 4, the device is made up of a scraper and deflection element 2 which is integral with drive casing 1. Scraper and deflection element 2 is in the shape of a wedge, for example, with one surface 60 sloping upwardly from the tip 10 and another surface 60 sloping downwardly to the rear toward drive casing 1. Soil and plant matter impacting upon the disc mower is thus carried away above or below drive casing 1 by inclined surfaces 60. Any downwardly bent cutter blade 3 will strike the scraper and deflection element 2, which may be made of high-grade hardened steel, for example, and is either straightened by element 2 or will break off.

Figure 5:
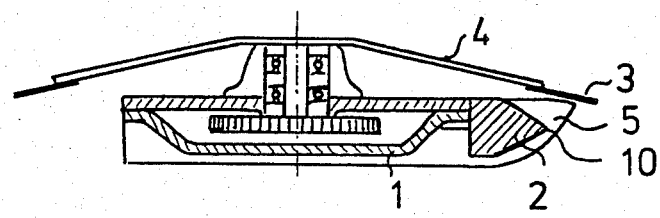
FIG. 5 is a sectional view of the embodiment of the disc mower shown in FIG. 4 along a line extending through a rotor shaft shown as 5—5 in FIG. 2.

FIG. 5 is a sectional view of drive casing 1, taken through the drive shaft of rotor 4. Scraper and deflection element 2 is rigidly connected to drive casing 1. Laterally adjacent scraper and deflection element 2 is stone guard 5 which merges into slide shoe 5'.

Figure 6:
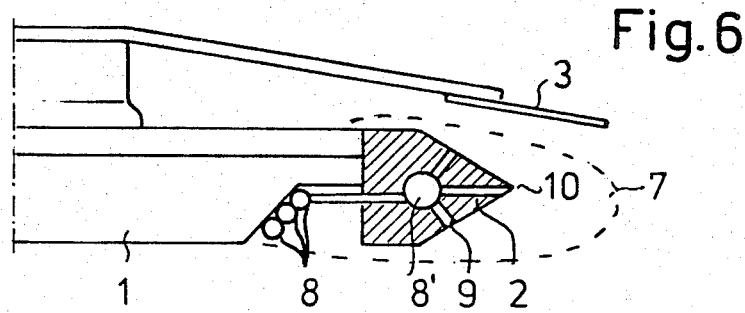
FIGS. 6 and 8 show scraper and deflection elements as shown in FIGS. 4 and 5 having compressed air supply lines and outlet nozzles, and movable pistons or bars, respectively.

As shown in FIG. 6, extending in or along drive casing 1 is at least one pressure supply line 8 from which tubes lead into channels 8' provided in scraper and deflection element 2. Inside element 2, channel 8' branches out into one or a plurality of nozzles 9. A compressor in the tractor, or a compressor disposed in the mowing unit, supplies the required compressed air, or pressurized water, so that any soil and plant material which may have accumulated on the front face of element 2 is intermittently or continuously removed. The layer 7 of soil and plant matter which may build up can be removed in many other ways by cleaning members. A few of these possibilities are described in the following.

It is not the primary function of the cleaning means to completely clean scraper and deflection element 2 but, rather, to prevent layer 7 from forming a bridge between two stone guards 5 and thereby impair the cutting function of the rotary cutters.

Figure 7:
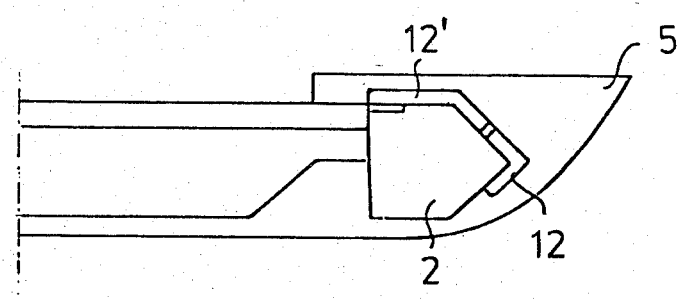
FIGS. 7 and 9 show other embodiments of scraper and deflection elements which are rigidly connected to the drive means and have cleaning members attached thereto.

FIG. 7 shows a cleaning member in the form of angular bar 12. Angular bar 12 is in close contact with front edge 10 of element 2. The bar is operable by a linkage, not shown, or a traction cable, so that it can be moved transversely to the direction of travel of the disc mower. In similar fashion, a second angular cleaning member 12' may be reciprocated on the upper surface of scraper and deflection element 2. In the inoperative position, member 12' is located in the area of stone guard 5.

Figure 8:
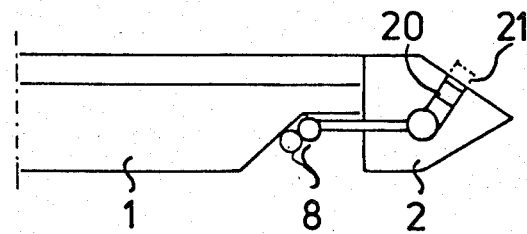

FIG. 8 shows the mass of soil and plant material which may be accumulating can also be pushed off by plunger 20 mounted within scraper and deflection element 2. This requires one or a plurality of pressure supply lines 8 for conducting the pressure medium, such as air, water, oil or the like, to the plunger which in its inoperative position lies completely within the range of the stone guard. Plunger 20 may also act upon bar 21 which has the same width as scraper and deflection element 2 and which in its inoperative position is flush with the surface of scraper and deflection element 2.

Figure 9:
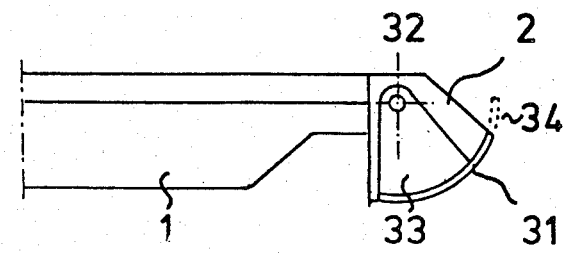

In the wedge-shaped embodiment of scraper-deflection element 2 as shown in FIG. 9, the lower inclined surface is arcuately curved. Disposed above this curved surface is cleaning member 31 having generally the same shape. Element 31 is pivotable about shaft 32 in a manner similar to a visor on a helmet. For this purpose, the cleaning members are joined to shaft 32 by arm segments 33. As cleaning member 31 is swung about shaft 32, the forward end 34 of cleaning member 31 pushes the mass of soil and plant matter upward so that the material partially enters the operative range of the knives and is flung aside by them. Thereupon, the cleaning member returns to its starting position in which it is again flush with scraper-deflection element 2.

Figure 10:
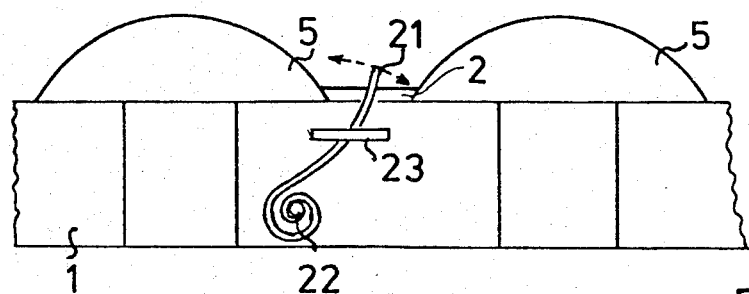
FIGS. 10–13 show cleaning members which are separate from the scraper and deflection elements, and also show pneumatic or hydraulic cleaning means.

Scraper-deflection element 2 may also be cleaned of a layer of soil and plant matter by means of tine-shaped cleaning elements. The cleaning tines are mounted on the underside of drive casing 1. The cleaning member reciprocates along the lower sloping surface and in front of forward edge 10 of scraper-deflection element 2. FIG. 10 illustrates an embodiment in which tine-shaped cleaning element 21 terminates with its rear end in a spiral spring and is fastened at point 22. The range of oscillation is defined by gate or stop 23. The movement of cleaning member 21 is produced by irregularities of the ground to which it is subjected during travel and by which it is propelled out of its inoperative position. When the obstacle has been overcome, cleaning tine 21 returns to its inoperative position.

Figure 11:
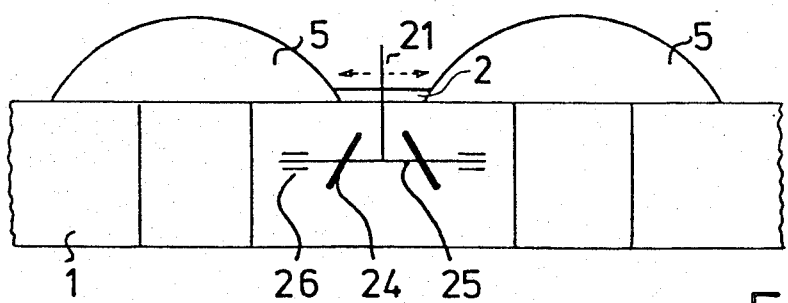

The embodiment of FIG. 11 is based on the same principle. Tine-shaped cleaning member 21 is attached to slide rod 25 which is movably mounted in two bearings 26. Mounted on the slide rod 25 in an angular relationship and transversely to the direction of travel are two deflectors 24. As the machine travels along, deflectors 24 are subjected to the unevennesses of the field as well as to the stubbles and thereby impart irregular oscillating movement to cleaning member 21.

Figure 12:
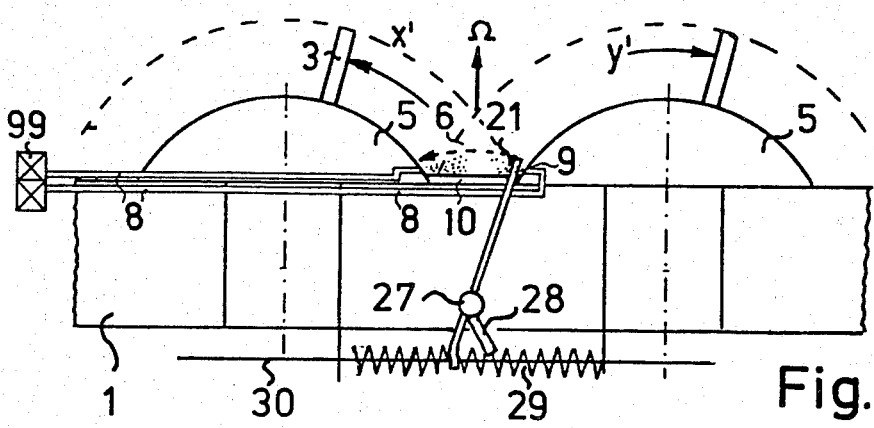

FIG. 12 illustrates simultaneously three embodiments. Again, tine-shaped cleaning member 21 oscillates between two adjacent stone guards. For this purpose, member 21 is rotatable about an approximately vertical axis 27 located in the rear of drive casing 1.

In one embodiment, the rearward extension of cleaning member 21 is connected to a deflecting plate 28 which is at a slight angle to the longitudinal extension of cleaning member 21. In the second embodiment, the rear extension is connected to a drive mechanism made up of a rod or bar or a wire rope 30 and is held between return springs 29. The rod or the wire rope may be operated from the tractor, either by machine or by hand.

The third embodiment shows the connections of compressed air or water supply lines 8 with outlet nozzles 9 disposed in the region of the stone guard. The air or water, respectively, that is being discharged in this area is effective to clean the overlap region in front of scraper-deflector element 2. At the same time, the volume, the pressure and the direction of the discharged air or water can be so controlled that the flow of air generated by the rotary cutters, which may be strong enough to bend thin growth down to the ground before it can be cut, can be deflected in the direction $\Omega$ so as to make it incapable of such bending. Control member 99 permits interruption of the flow of the medium or variance of its intensity.

The medium to produce the cleaning effect may also be a mixture of water and air.

Figure 13:
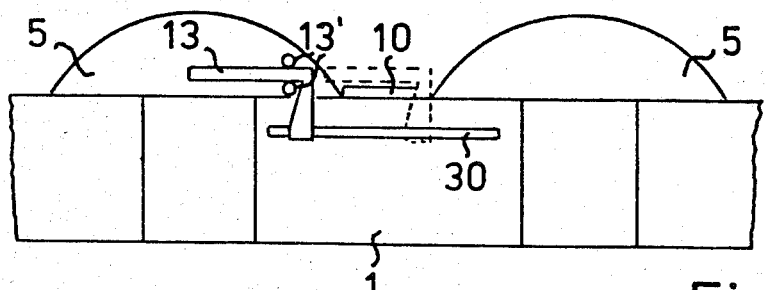

In similar manner, in the embodiment of FIG. 13, blade-type cleaning member 13 is reciprocated in front of the forward edge 10 of scraper-deflector element 2. Cleaning member 13 is additionally guided at one side in a bearing 13'. The working of the rod or wire pull again is possible by various operative modes.

The embodiments described in the following represent examples of movable scraper-deflection elements. Depending on each particular embodiment, it is contemplated to impart a swinging motion to the scraper-deflection element in order to shake off any accumulation of soil and plant matter and to move the scraper-deflection element in such a manner that the built up soil and plant layer is passed into the operative range of knives 3 or, if scraper-deflection element 2 is moving downwardly, is scraped off by the action of the stubbles in the field.

Figure 14:
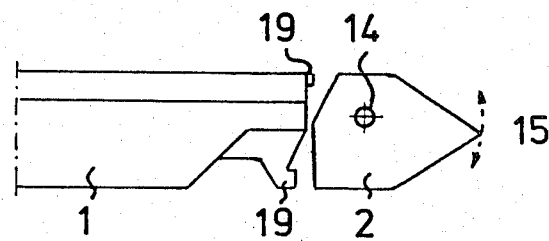
FIGS. 14–19 show embodiments having movable scraper and deflection elements.

As shown in FIG. 14, the most simplified embodiment merely provides for scraper-deflection element 2 to be set into swinging motion about an axis 14 within a certain range 15 by the vibrations of the mower and the unevenness of the ground. The swinging range of scraper-deflection element 2 is limited by stops 19.

Figure 15:
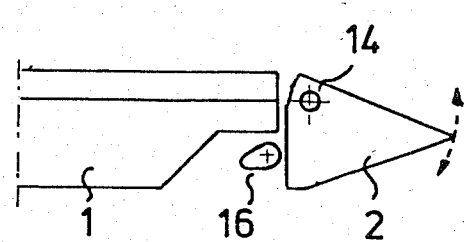

In the embodiment of FIG. 15, scraper-deflection element 2 is subjected to the action of eccentric 16 which is operative to impart movement to scraper-deflection element 2. The eccentric acts upon the reverse side of scraper-deflection element 2 and causes it to be pivoted about axis 14. The eccentric is operated either by the power take-off shaft or by a ground engaging wheel. Pivot range 15 is limited by the particular configuration of the back side of scraper-deflection element 2.

Figure 16:
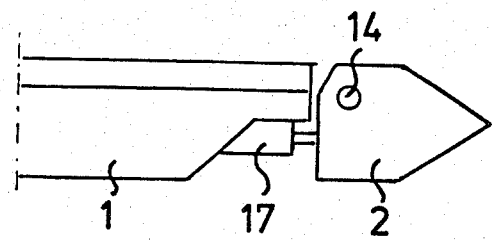

Replacement of eccentric 16 by a piston-and-cylinder unit 17 results in the embodiment shown in FIG. 16. Instead of a swinging movement, scraper-deflection element 2 is moved upwardly about axis 14 until the upper surface has been cleaned by the knives of the rotors and is then moved downwardly until the underside has been cleaned by the scraping action of the stubbles in the field. Instead of the piston-cylinder unit, an electromechanical system such as, for example, a plunger-type armature, may also be used.

Figure 18:
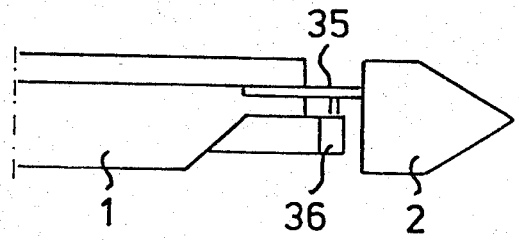

The axis of rotation 14 described in the previous embodiments may be replaced by spring loaded steel plate 35 approximately as wide as scraper-deflection element 2. FIG. 18 shows spring loaded steel plate 35 clamped at one side between the two half portions of drive casing 1, for example, and is fastened on the reverse side of scraper-deflection element 2 about midway between top and bottom. In this embodiment, spring loaded steel plate 35 is acted upon by piston-cylinder unit 36.

Figure 19:
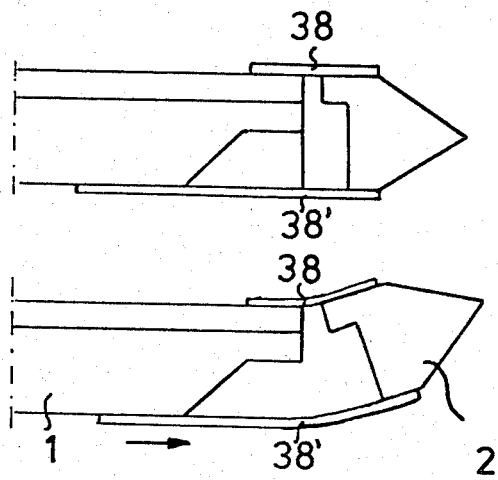

The movability of scraper-deflection element 2 may be achieved by means of two resilient spring loaded steel plates. In FIG. 19, upper steel plate 38 is rigidly secured to drive casing 1 and scraper-deflection element 2. Lower steel plate 38' is adapted to be slidably moved back and forth to enable forward edge 10 of the scraper-deflection unit 2 to move up and down.

Figure 17:
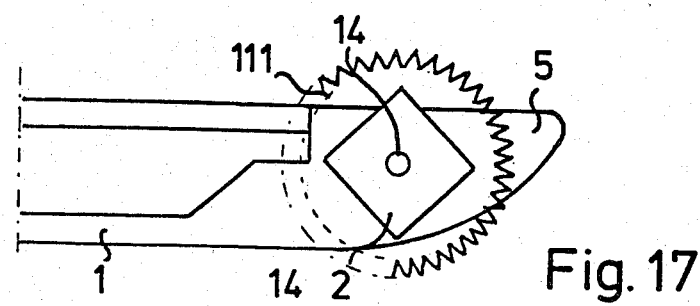

Another embodiment is shown in FIG. 17. Here, the configuration of scraper-deflection element 2 is significantly different from the previously described embodiments of scraper-deflection element 2. In the embodiment of FIG. 17, scraper-deflection element 2 is symmetric about axis 14. While its basic shape is generally similar to the previously described scraper and deflection elements, both its front and back end portions are wedge-shaped. By selecting a particular angle of the sloping surfaces (for example, 45° for each surface above and below the horizontal), a scraper and deflection element 2 is produced that is square or rectangular in cross section. This enables scraper and deflection element 2 to not only oscillate about axis 14, but to perform a complete rotation about axis 14. The axle may be replaced by a shaft which again may be driven by a ground engaging wheel 111.

The presentation of a multiplicity of embodiments as described and illustrated should not be construed as being limiting but, rather, is intended to exemplify the broad spectrum of the basic invention.

The performance of scraper-deflection element 2 may be further improved by suitable modifications of the particular shape of the stone guard.

Figure 3A:
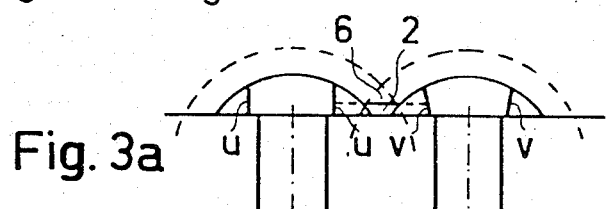
FIG. 3a is an enlarged portion of FIG. 3.
Figure 3B:
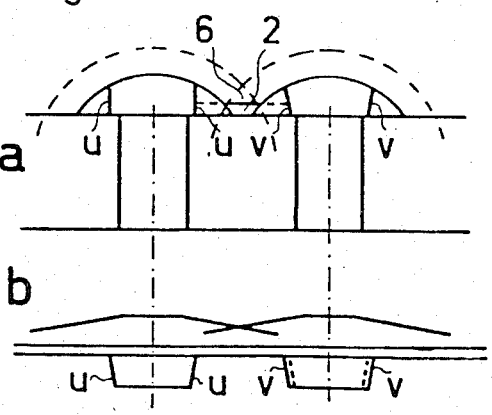

For example, moving the lateral surfaces of stone guard 5 facing the scraper-deflection element 2 more inwardly toward drive casing, shown as U and V in FIGS. 3a and 3b, will make it easier for obstructions to impinge upon scraper-deflection element 2 with the result that increased motion is imparted to scraper-deflection element 2 or a cleaning attachment (FIG. 3).

This particular configuration is also important in the prevention of a bridge formation by a mass of soil and plant matter. To achieve the latter objective, the embodiment has also been found useful in which the lateral surfaces of the stone guard facing the scraper-deflection element are oriented approximately parallel to the direction of travel of the machine.

I claim:

1. Device for preventing clogging and effective for breaking up soil and plant matter in a disc mower which is provided with drive means disposed in a drive casing for driving disc-shaped rotary cutting members and knives attached thereto and is further provided with slide shoes and stone guard members secured on said drive casing characterized in having at the front face of said drive casing (1) below the plane of said blades (3) and between said rotary cutter discs (4) in an overlap region (6) of said blades, at least one wedge-shaped scraper and deflection element (2) disposed in the front of said drive casing (1), said scraper and deflection element (2) having at least one surface which slopes rearwardly upwardly toward said drive casing and at least one surface which slopes rearwardly downwardly, and wherein pressure supply lines (8) which terminate in nozzles (9) are provided in at least one of said sloping surfaces (60) in the region of said scraper and deflection element (2).

2. Device according to claim 1, characterized in that said pressure supply lines (8) are in communication with hydraulic or pneumatic means which operate plungers (20) adapted to extend from at least one of said sloping surfaces (60) of said scraper and deflection element (2).

3. Device according to claim 2, characterized in that said plungers (20) act upon bars which are capable of being extended from at least one of said sloping surfaces (80) of said scraper and deflection element (2).

4. Device for preventing clogging and effective for breaking up soil and plant matter in a disc mower which is provided with drive means disposed in a drive casing for driving disc-shaped rotary cutting members and knives attached thereto and is further provided with slide shoes and stone guard members secured on said drive casing, characterized in having at the front face of said drive casing (1) below the plane of said blades (3) and between said rotary cutter discs (4) in an overlap region (6) of said blades at least one means effective to prevent clogging and to break up any accumulation of soil and plant matter in this region, and further provided with nozzles (9) in the region of said stone guard (5) which are connected to compressed air or water supply lines (8).

5. Device according to claim 4, characterized in that said compressed air or water supply lines (8) are in operative communication with control member (99).

* * * * *